(12) United States Patent
Kim

(10) Patent No.: US 10,518,762 B2
(45) Date of Patent: Dec. 31, 2019

(54) ELECTRIC BOOSTER

(71) Applicant: HYUNDAI MOBIS CO., LTD., Seoul (KR)

(72) Inventor: Jong Sung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 51 days.

(21) Appl. No.: 15/974,495

(22) Filed: May 8, 2018

(65) Prior Publication Data

US 2019/0001948 A1    Jan. 3, 2019

(30) Foreign Application Priority Data

Jun. 28, 2017    (KR) .................. 10-2017-0081599

(51) Int. Cl.
| | | |
|---|---|---|
| *B60T 13/74* | (2006.01) | |
| *B60T 13/14* | (2006.01) | |
| *B60T 13/68* | (2006.01) | |
| *F16D 48/04* | (2006.01) | |
| *B60T 8/36* | (2006.01) | |
| *F16D 125/40* | (2012.01) | |
| *F16D 48/02* | (2006.01) | |

(52) U.S. Cl.
CPC ............ *B60T 13/745* (2013.01); *B60T 8/363* (2013.01); *B60T 13/145* (2013.01); *B60T 13/686* (2013.01); *F16D 48/04* (2013.01); *F16D 2048/0212* (2013.01); *F16D 2125/40* (2013.01)

(58) Field of Classification Search
CPC ...... B60T 13/745; B60T 13/686; B60T 8/363; B60T 13/145; F16D 48/04; F16D 2125/40; F16D 2048/0212
See application file for complete search history.

(56) References Cited

U.S. PATENT DOCUMENTS

| | | | | |
|---|---|---|---|---|
| 4,918,921 | A * | 4/1990 | Leigh-Monstevens | ................... B60T 13/745 310/83 |
| 5,454,631 | A * | 10/1995 | Frieling | .................. B60T 8/489 303/113.2 |
| 6,024,422 | A * | 2/2000 | Drennen | .................... B60T 8/00 303/115.2 |
| 2013/0025273 | A1* | 1/2013 | Nozawa | .................. B60T 7/042 60/545 |
| 2016/0272181 | A1* | 9/2016 | Lee | .......................... F04B 17/03 |

FOREIGN PATENT DOCUMENTS

| | | | |
|---|---|---|---|
| KR | 10-2012-0045597 A | | 5/2012 |
| KR | 20120045597 A | * | 5/2012 |

* cited by examiner

*Primary Examiner* — Thomas E Lazo
(74) *Attorney, Agent, or Firm* — Knobbe Martens Olson & Bear LLP

(57) ABSTRACT

An electric booster may include: a motor part configured to be driven by power applied thereto; a body part mounted and fixed onto the motor part; a cylinder part coupled to the body part; a screw part connected to the motor part and rotated; a nut part embedded in the body part, and screwed to the screw part so as to linearly move; a first piston part constraining an end of the screw part, and moved to the cylinder part while being pressed by the nut part; a first elastic part supporting the first piston part; a second piston part supported by the first elastic part; and a second elastic part supporting the second piston part.

12 Claims, 5 Drawing Sheets

ELECTRIC BOOSTER

CROSS-REFERENCES TO RELATED APPLICATIONS

The present application claims priority to Korean application number 10-2017-0081599, filed on Jun. 28, 2017, which is incorporated by reference in its entirety.

BACKGROUND OF THE INVENTION

The present invention relates to an electric booster, and more particularly, to an electric booster capable of preventing a part damage by an excessive screw rotation when a braking force is released.

In general, an electric booster drives a motor to press a master cylinder, and the master cylinder generates a brake pressure. Such an electric booster includes a motor, a screw rotated by the motor, a nut linearly moved by the screw, and a piston generating a brake pressure while being moved by the nut. In such an electric booster, the screw is only rotated, and the nut is only linearly moved. Therefore, a ring is assembled to the screw, in order to prevent a part separation.

However, when precise control is not performed while a brake force is released, the screw may be additionally rotated even though the nut is returned to the original state. The additional rotation of the screw may excessively move the nut, thereby causing a damage of the part. Thus, there is a demand for a device capable of solving such a problem.

The related art is disclosed in Korean Patent Publication No. 2012-0045597 published on May 9, 2012 and entitled "Electric booster-type brake".

SUMMARY OF THE INVENTION

Embodiments of the present invention are directed to an electric booster capable of preventing a part damage by an excessive screw rotation when a braking force is released.

In one embodiment, an electric booster may include: a motor part configured to be driven by power applied thereto; a body part mounted and fixed onto the motor part; a cylinder part coupled to the body part; a screw part connected to the motor part and rotated; a nut part embedded in the body part, and screwed to the screw part so as to linearly move; a first piston part constraining an end of the screw part, and moved to the cylinder part while being pressed by the nut part; a first elastic part supporting the first piston part; a second piston part supported by the first elastic part; and a second elastic part supporting the second piston part. The first piston part may include: a first piston tube part embedded in the body part and the cylinder part; a first piston inner wall part formed in the first piston tube part, and supported by the first elastic part; and a first piston protrusion part protruding from the first piston inner wall part toward the screw part, and limiting movement of the screw part.

The body part may include: a body insertion part inserted into a motor insertion part formed in the motor part, and separated from the motor insertion part; a body coupling part extended laterally from the body insertion part, and coupled to the motor part; and a body tube part extended from the body coupling part, and coupled to the cylinder part.

The body tube part may have a larger inner diameter than the body insertion part, and the body coupling part may have a body stepped part formed therein.

The screw part may include: a screw coupling part spline-coupled to the motor part through the body insertion part; a screw embedment part formed in the screw coupling part, and embedded in the body insertion part; and a screw shaft part extended from the screw embedment part, having a screw thread formed on the outer circumferential surface thereof, and restricted from linearly moving when being locked to the inside of the first piston part.

The screw embedment part may be guided by the body insertion part, and restricted from moving in a lateral direction.

The nut part may include: a nut movement part screwed to the screw shaft part, and linearly moved; and a nut induction part protruding from the outside of the nut movement part, and guided by the body tube part so as to restrict rotation of the nut movement part.

The nut movement part may be moved toward the first piston part when the screw shaft part is rotated in one direction, and moved toward the motor part when the screw shaft part is rotated in the other direction.

The plurality of nut induction parts may be arranged in the circumferential direction of the nut movement part.

The body tube part may have body tube guide parts formed therein, the body tube guide parts serving to guide the respective nut induction parts.

The nut part may further include a nut damper part mounted in the body coupling part and brought in contact with the nut induction part so as to absorb a shock.

The nut damper part may be formed of a soft material, and disposed in a ring shape on the body stepped part.

The first elastic part may be disposed between the second piston part and the first piston part, and the first and second piston parts may be moved in the opposite direction of the motor part.

DESCRIPTION OF SPECIFIC EMBODIMENTS

Hereafter, an electric booster in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
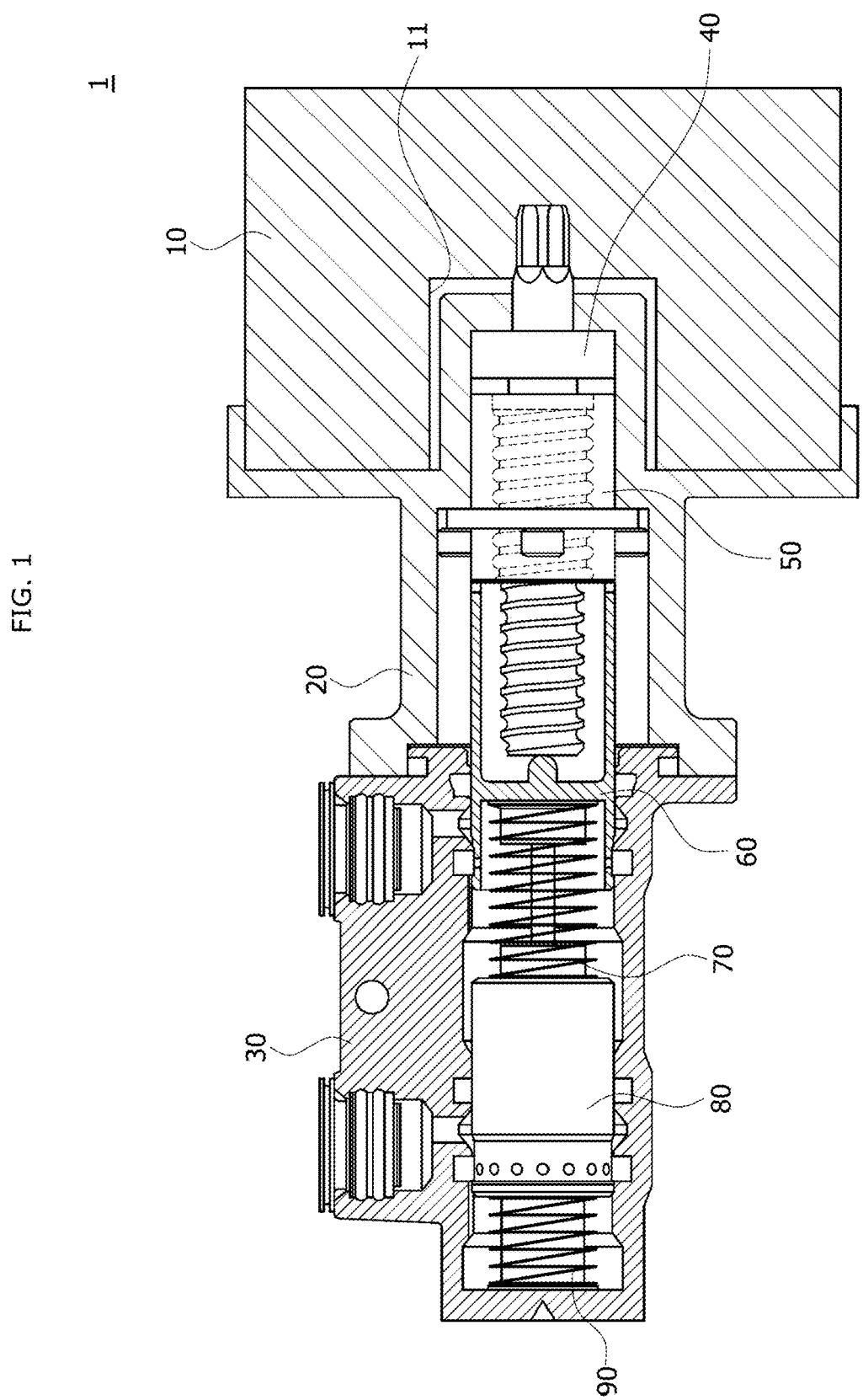
FIG. 1 schematically illustrates an electric booster in accordance with an embodiment of the present invention.

FIG. 1 schematically illustrates an electric booster in accordance with an embodiment of the present invention. Referring to FIG. 1, the electric booster 1 in accordance with the embodiment of the present invention may include a motor part 10, a body part 20, a cylinder part 30, a screw part 40, a nut part 50, a first piston part 60, a first elastic part 70, a second piston part 80 and a second elastic part 90.

The motor part 10 may be driven by power applied thereto, and rotate the screw part 40 in one direction or the other direction. The body part 20 may be mounted and fixed onto the motor part 10, and the screw part 40 may be embedded in the body part 20. The cylinder part 30 may be coupled to the body part 20. For example, the body part 20 and the cylinder part 30 may communicate with each other, and the cylinder part 30 may store oil for generating a brake pressure.

The nut part 50 may be embedded in the body part 20, and screwed to the screw part 40 so as to be linearly moved. The first piston part 60 may constrain an end of the screw part 40, and be moved to the cylinder part 30 while being pressed by the nut part 50. The first elastic part 70 may have a restoring force to support the first piston part 60. The second piston part 80 may be supported by the first elastic part 70, and the second elastic part 90 may support the second piston part 80 and provide a restoring force for the second piston part 80.

For example, the first elastic part 70 may be disposed between the second piston part 80 and the first piston part 60. While the first and second piston parts 60 and 80 are moved in the opposite direction of the motor part 10, the pressure of the oil stored in the cylinder part 30 may be raised to provide a brake pressure. The cylinder part 30 may have a plurality of seal cups to prevent an oil leakage.

Figure 2:
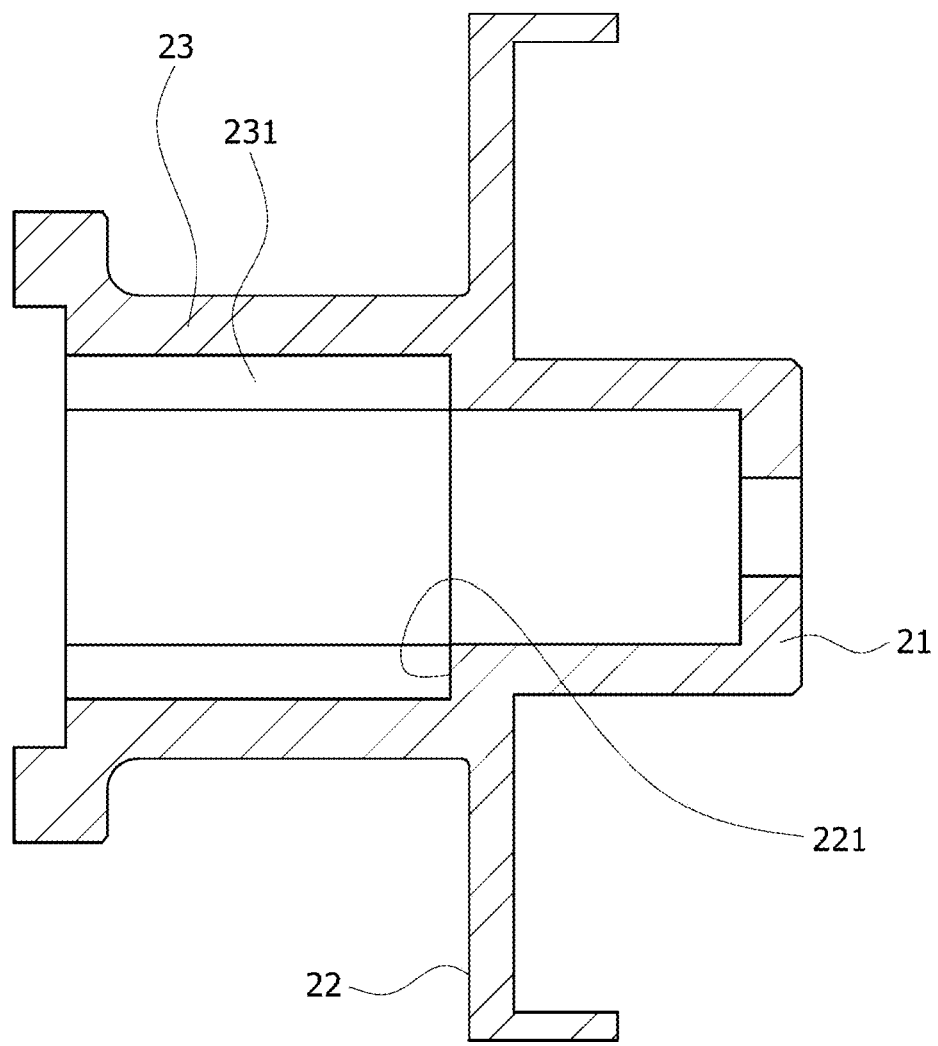
FIG. 2 schematically illustrates a body part of the electric booster in accordance with the embodiment of the present invention.

FIG. 2 schematically illustrates the body part of the electric booster in accordance with the embodiment of the present invention. Referring to FIGS. 1 and 2, the body part 20 in accordance with the present embodiment may include a body insertion part 21, a body coupling part 22 and a body tube part 23.

The body insertion part 21 may be inserted into a motor insertion part 11 formed in the motor part 10. The body insertion part 21 may be separated from the motor insertion part 11 so as not to interfere with the motor part 10. For example, the body insertion part 21 may be formed in a tube shape of which one side is closed while the other side thereof is opened.

The body coupling part 22 may be extended in a lateral direction from the body insertion part 21, and coupled to the motor part 10. For example, the body coupling part 22 may be extended in the lateral direction from the outer circumferential surface of the body insertion part 21, and screwed to the motor part 10.

The body tube part 23 may be extended from the body coupling part 22, and coupled to the cylinder part 30. For example, the body tube part 23 may have a larger inner diameter than the body insertion part 21, such that a body stepped part 221 is formed in the body coupling part 22.

Figure 3:
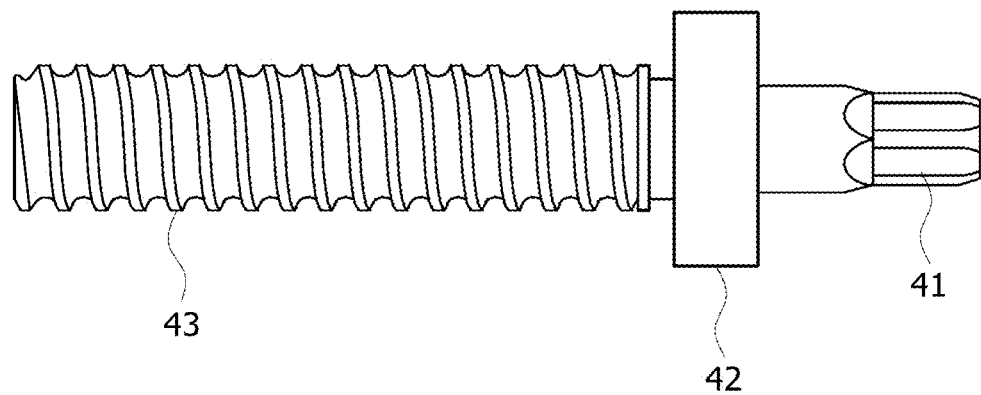
FIG. 3 schematically illustrates a screw part of the electric booster in accordance with the embodiment of the present invention.

FIG. 3 schematically illustrates the screw part of the electric booster in accordance with the embodiment of the present invention. Referring to FIGS. 1 and 3, the screw part 40 in accordance with the present embodiment may include a screw coupling part 41, a screw embedment part 42 and a screw shaft part 43.

The screw coupling part 41 may be spline-coupled to the motor part 10 through the body insertion part 21. Therefore, the screw coupling part 41 may be rotated while maintaining the connection with the motor part 10. The screw coupling part 41 may be linearly moved in the axial direction.

The screw embedment part 42 may be formed on the screw coupling part 41, and embedded in the body insertion part 21. For example, the screw embedment part 42 may be formed in a cylindrical shape to rotate in the body insertion part 21. The screw embedment part 42 may be guided by the body insertion part 21, and restricted from moving in a lateral direction. Between the screw embedment part 42 and the body insertion part 21, a bearing may be formed to suppress friction during rotation.

The screw shaft part 43 may be extended from the screw embedment part 42, and have a screw thread formed on the outer circumferential surface thereof. When the screw shaft part 43 is locked to the inside of the first piston part 60, the linear movement of the screw shaft part 43 may be restricted. Therefore, although a separate fixing ring is not installed in the screw coupling part 41 disposed in a space formed between the motor insertion part 11 and the body insertion part 21, the connection between the screw coupling part 41 and the motor part 10 can be maintained.

Figure 4:
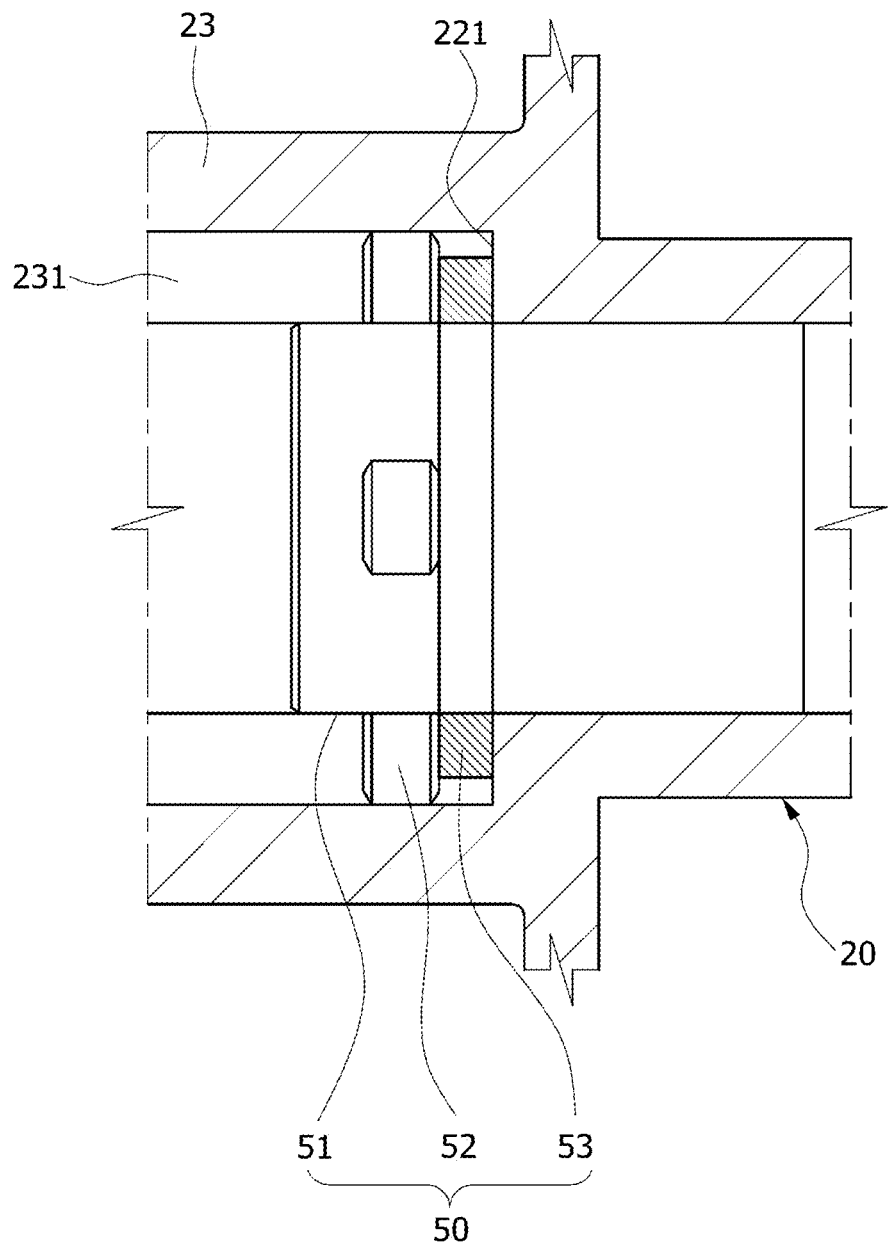
FIG. 4 schematically illustrates a nut part of the electric booster in accordance with the embodiment of the present invention.

FIG. 4 schematically illustrates the nut part of the electric booster in accordance with the embodiment of the present invention. Referring to FIGS. 1 to 4, the nut part 50 in accordance with the embodiment of the present invention may include a nut movement part 51 and a nut induction part 52, and additionally include a nut damper part 53.

The nut movement part 51 may be screwed to the screw shaft part 43, and linearly moved. For example, the nut movement part 51 may be formed in a cylindrical shape, such that the inner surface thereof is screwed to the screw shaft part 43. When the screw shaft part 43 is rotated in one direction, the nut movement part 51 may be moved toward the first piston part 60. On the other hand, when the screw shaft part 43 is rotated in the other direction, the nut movement part 51 may be moved toward the motor part 10.

The nut induction part 52 may protrude from the outside of the nut movement part 51, and restrict rotation of the nut movement part 51 while being guided by the body tube part 23. For example, the plurality of nut induction parts 52 may be arranged in the circumferential direction of the nut movement part 51. The body tube part 23 may have body tube guide parts 231 formed therein, the body tube guide parts 231 serving to guide the respective nut induction parts 52.

The nut damper part 53 may be mounted on the body coupling part 22, and absorb a shock through a contact with the nut induction part 52. The nut damper part 53 may block noise caused by a direct contact between the nut induction part 52 and the body coupling part 22. For example, the nut damper part 53 may be formed of a soft material for shock absorption, and disposed in a ring shape on the body stepped part 221.

Figure 5:
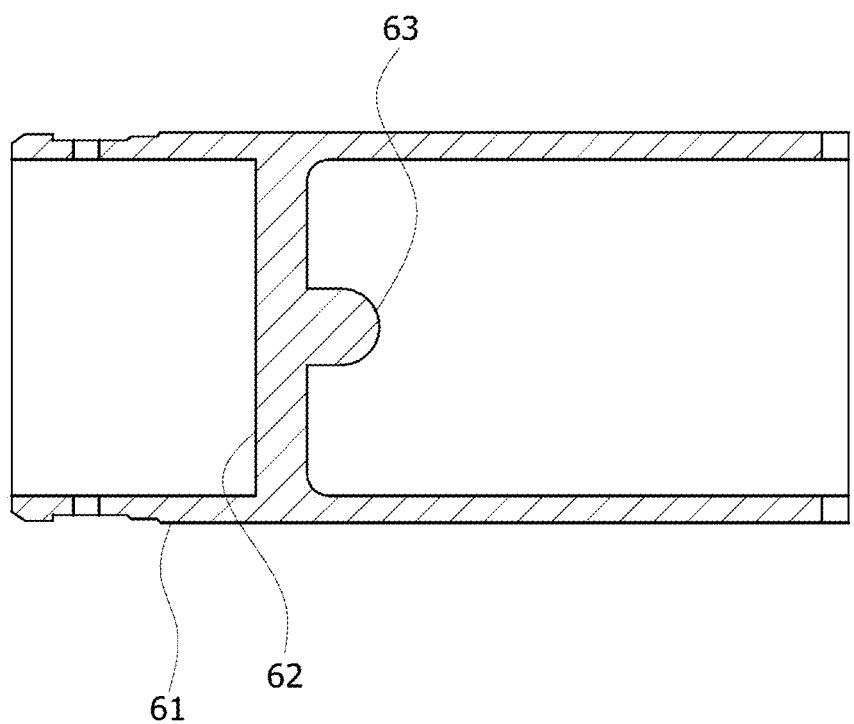
FIG. 5 schematically illustrates a first piston part of the electric booster in accordance with the embodiment of the present invention.

FIG. 5 schematically illustrates the first piston part of the electric booster in accordance with the embodiment of the present invention. Referring to FIGS. 1 and 5, the first piston part 60 in accordance with the embodiment of the present invention may include a first piston tube part 61, a first piston inner wall part 62 and a first piston protrusion part 63.

The first piston tube part 61 may be embedded in the body tube part 23 and the cylinder part 30. For example, the first piston tube part 61 may be formed in a cylindrical shape, such that a part of the first piston tube part 61 is embedded in the body tube part 23, and the other part of the first piston tube part 61 is embedded in the cylinder part 30.

The first piston inner wall part 62 may be formed in the first piston tube part 61, and supported by the first elastic part 70. For example, the first piston inner wall part 62 may close the inside of the first piston tube part 61. While braking is not performed, the first piston inner wall part 62 may be disposed at the boundary between the body part 20 and the cylinder part 30. The first elastic part 70 may be inserted into the first piston tube part 61 formed at the left side of the first piston inner wall part 62. The screw shaft part 43 may be inserted into the first piston tube part 61 formed at the right side of the first piston inner wall part 62.

The first piston protrusion part 63 may protrude from the first piston inner wall part 62 toward the screw shaft part 43, and limit the linear movement of the screw shaft part 43. For example, the first piston protrusion part 63 may come in contact with the screw shaft part 43 while braking is not performed. At this time, in order to minimize friction between the first piston protrusion part 63 and the screw shaft part 43, the first piston protrusion part 63 may be formed in a rounded shape so as to come in point contact with the screw shaft part 43.

The operation of the electric booster having the above-described structure in accordance with the embodiment of the present invention will be described as follows.

When a driver steps on a brake pedal, the motor part 10 may be driven to rotate the screw part 40 in one direction, and the nut part 50 may be advanced and moved toward the first piston part 60. Then, the first and second piston parts 60 and 80 may be pressed to raise the internal hydraulic pressure of the cylinder part 30, thereby generating a brake pressure.

When the brake is released, the motor part 10 may be driven to rotate the screw part 40 in the other direction. In this case, the nut part 50 may be retreated and moved toward the motor part 10. At this time, when the motor part 10 is driven by a sensor or operation error with the nut part 50 returned to the original position, the nut induction part 52 may reach the nut damper part 53 so as to restrict an additional linear movement of the nut part 50.

When the motor part 10 is additionally driven in such a state, the rotational force of the motor part 10 may not additionally move the nut part 50, but move the screw part 40 toward the first piston part 60 while rotating and linearly moving the screw part 40. Therefore, a damage of the nut induction part 52 may be prevented.

That is, when the screw shaft part 43 pushes the first piston protrusion part 63, the first elastic part 70 can be contracted to momentarily relieve a shock. When the braking release control is ended, the screw part 40 and the first piston part 60 may be returned to the original positions by the restoring forces of the first and second elastic parts 70 and 90.

In the electric booster 1 in accordance with the embodiment of the present invention, a position fixing ring can be removed from the screw part 40 because the first piston part 60 constrains the end of the screw part 40.

In the electric booster 1 in accordance with the embodiment of the present invention, the nut induction part 52 can be brought in contact with the nut damper part 53, and absorb a shock while reducing noise.

In the electric booster 1 in accordance with the embodiment of the present invention, although an excessive operation of the motor part 10 is caused when braking is released, the screw part 40 can be rotated and linearly moved to block a damage of the nut induction part 52, and the first elastic part 70 can perform a buffering function.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:
1. An electric booster comprising:
   a motor part configured to be driven by power applied thereto;
   a body part mounted and fixed onto the motor part;
   a cylinder part coupled to the body part;
   a screw part connected to the motor part and rotated;
   a nut part embedded in the body part, and screwed to the screw part so as to linearly move;
   a first piston part constraining an end of the screw part, and moved to the cylinder part while being pressed by the nut part;
   a first elastic part supporting the first piston part;
   a second piston part supported by the first elastic part; and
   a second elastic part supporting the second piston part,
   wherein the first piston part comprises:
   a first piston tube part embedded in the body part and the cylinder part;
   a first piston inner wall part formed in the first piston tube part, and supported by the first elastic part; and
   a first piston protrusion part protruding from the first piston inner wall part toward the screw part, and limiting movement of the screw part.

2. The electric booster of claim 1, wherein the body part comprises:
   a body insertion part inserted into a motor insertion part formed in the motor part, and separated from the motor insertion part;
   a body coupling part extended laterally from the body insertion part, and coupled to the motor part; and
   a body tube part extended from the body coupling part, and coupled to the cylinder part.

3. The electric booster of claim 2, wherein the body tube part has a larger inner diameter than the body insertion part, and the body coupling part has a body stepped part formed therein.

4. The electric booster of claim 3, wherein the screw part comprises:
   a screw coupling part spline-coupled to the motor part through the body insertion part;
   a screw embedment part formed in the screw coupling part, and embedded in the body insertion part; and
   a screw shaft part extended from the screw embedment part, having a screw thread formed on the outer circumferential surface thereof, and restricted from linearly moving when being locked to the inside of the first piston part.

5. The electric booster of claim 4, wherein the screw embedment part is guided by the body insertion part, and restricted from moving in a lateral direction.

6. The electric booster of claim 4, wherein the nut part comprises:
   a nut movement part screwed to the screw shaft part, and linearly moved; and
   a nut induction part protruding from the outside of the nut movement part, and guided by the body tube part so as to restrict rotation of the nut movement part.

7. The electric booster of claim 6, wherein the nut movement part is moved toward the first piston part when the screw shaft part is rotated in one direction, and moved toward the motor part when the screw shaft part is rotated in the other direction.

8. The electric booster of claim 6, wherein the plurality of nut induction parts are arranged in the circumferential direction of the nut movement part.

9. The electric booster of claim 8, wherein the body tube part has body tube guide parts formed therein, the body tube guide parts serving to guide the respective nut induction parts.

10. The electric booster of claim 6, wherein the nut part further comprises a nut damper part mounted in the body coupling part and brought in contact with the nut induction part so as to absorb a shock.

11. The electric booster of claim 10, wherein the nut damper part is formed of a soft material, and disposed in a ring shape on the body stepped part.

12. The electric booster of claim 1, wherein the first elastic part is disposed between the second piston part and the first piston part, and the first and second piston parts are moved in the opposite direction of the motor part.

* * * * *